US005932356A

United States Patent [19]

Sileo et al.

[11] Patent Number: 5,932,356

[45] Date of Patent: Aug. 3, 1999

[54] ABRASIVE/ABRADABLE GAS PATH SEAL SYSTEM

[75] Inventors: Gerard A. Sileo, Jupiter; William J. Woodard, Palm Beach Gardens; Frederick C. Walden, Jensen Beach; Harold W. Pettit, Jr., West Palm Beach; Timothy A. Twigg, Port St. Lucie, all of Fla.

[73] Assignee: United Technologies Corporation, Hartford, Conn.

[21] Appl. No.: 08/620,058

[22] Filed: Mar. 21, 1996

[51] Int. Cl.$^{6}$ .......... B32B 15/04

[52] U.S. Cl. .......... 428/457; 428/143; 428/206; 428/323; 428/328; 428/331; 428/402; 428/403; 428/472; 428/565; 428/698; 428/701; 501/87; 501/94; 501/96; 501/295; 501/309

[58] Field of Search .......... 428/323, 328, 428/331, 402, 403, 565, 621, 559, 206, 143, 457, 698, 701, 702, 472, 469; 51/295, 309; 501/87, 94, 96, 97.4; 75/252

[56] References Cited

U.S. PATENT DOCUMENTS

| | | | |
|---|---|---|---|
| 4,169,020 | 9/1979 | Stalker et al. | 204/16 |
| 4,227,703 | 10/1980 | Stalker et al. | 277/53 |
| 4,232,995 | 11/1980 | Stalker et al. | 415/172 A |
| 4,507,224 | 3/1985 | Toibana et al. | 252/516 |
| 4,543,345 | 9/1985 | Wei | 501/95 |
| 4,566,700 | 1/1986 | Shiembob | 277/53 |
| 4,610,698 | 9/1986 | Eaton et al. | 51/295 |
| 4,744,725 | 5/1988 | Matarese et al. | 415/172 A |
| 4,867,761 | 9/1989 | Brandt et al. | 51/309 |
| 4,876,227 | 10/1989 | DeAngelis | 501/97 |
| 4,902,653 | 2/1990 | Komatsu et al. | 501/97 |
| 4,936,745 | 6/1990 | Vine et al. | 415/173.4 |
| 4,961,757 | 10/1990 | Rhodes et al. | 51/309 |
| 5,017,402 | 5/1991 | McComas | 427/34 |
| 5,023,211 | 6/1991 | Kumaki et al. | 501/87 |
| 5,024,976 | 6/1991 | Mehrotra et al. | 501/89 |
| 5,059,095 | 10/1991 | Kushner et al. | 416/241 B |
| 5,122,182 | 6/1992 | Dorfman et al. | 75/252 |
| 5,143,668 | 9/1992 | Hida | 264/63 |
| 5,385,760 | 1/1995 | Schassberger et al. | 427/443.1 |
| 5,449,647 | 9/1995 | Brandt | 501/95 |
| 5,453,329 | 9/1995 | Everett et al. | 428/565 |

*Primary Examiner*—Deborah Jones
*Assistant Examiner*—Abraham Bahta
*Attorney, Agent, or Firm*—Richard D. Getz

[57] ABSTRACT

A composite ceramic coating having abrasive properties for application to a metallic substrate is provided which includes a ceramic matrix and a plurality of ceramic abrasive particles disposed within said ceramic matrix. The abrasive particles have a shear strength substantially greater than that of the ceramic matrix and possess an angular geometry. A method for providing an abrasive coating on a metallic article is also provided.

13 Claims, 1 Drawing Sheet

ABRASIVE/ABRADABLE GAS PATH SEAL SYSTEM

BACKGROUND OF THE INVENTION

1. Technical Field

This invention relates to the field of seals used in rotating machinery to prevent the leakage of fluids. This invention relates more specifically to the abrasive components used in abrasive\abradable seals which prevent interaction between moving components in the aforementioned rotating machinery.

2. Background Information

Turbine and compressor sections within an axial flow turbine engine generally include one or more rotor assemblies each having a plurality of rotor blades circumferentially disposed around a disk rotating within a cylindrical case. For efficiency sake, each rotor assembly includes seals for sealing between the rotating members and the stationary members. The seals increase the efficiency of the engine by preventing the leakage of air where little or no work can be either imparted or extracted. Abradable seals, which include a "hard" abrasive component designed to contact a "soft" abradable component, are a popular choice for such seals. The abradable component generally consists of a brittle, frangible material that in theory breaks cleanly away when contacted by an abrasive component. The abrasive component, on the other hand, consists of a hardened, tough material that in theory will not yield during contact with the abradable component. In the case of the blade outer air seal, the abrasive component is typically applied to the blade tips and the abradable component is applied to the inner diameter of the case. Disparate thermal and/or dynamic growth between the rotor assembly and the case causes the abrasive component to contact the abradable component and thereby seal between the two components. The softer abradable component yields to the abrasive component and thereby prevents mechanical damage to either the blade tips or the case.

A disadvantage of abradable seals is that some compatible abrasive and abradable components perform best at high incursion rates, while others perform best at low incursion rates. The incursion rate between a rotating member and a structure radially outside of the rotating member reflects the frequency at which the rotating member strikes the structure and the magnitude of interference between the two at each pass. Very few abrasive and abradable components provide optimum performance at both high and low incursion rates. For example, it is known that ceramic particulate matter dispersed within a metal matrix may be used as an abrasive component. At low incursion rates, the particulate matter favorably operates as a plurality of minute cutters to "machine" a path within the abradable component. At high incursion rates, however, elevated temperatures can compromise the metal matrix and cause it to release the ceramic particulate matter. The degradation of the abrasive component creates a greater than optimum gap between the rotor and the case and thereby decreases the efficiency of the engine.

What is needed is a abrasive component for an abradable seal for a gas turbine engine that performs favorably at high and low incursion rates.

DISCLOSURE OF THE INVENTION

It is, therefore, an object of the present invention to provide an abrasive coating that is durable.

It is another object of the present invention to provide an abrasive coating that performs well at high and low incursion rates.

It is still another object of the present invention to provide an abrasive coating that may be readily applied.

According to the present invention, a composite ceramic coating having abrasive properties for application to a metallic substrate is provided which includes a ceramic matrix and a plurality of ceramic abrasive particles disposed within said ceramic matrix. The abrasive particles have a shear strength substantially greater than that of the ceramic matrix and possess an angular geometry.

An advantage of the present invention is that the abrasive coating performs well at both high and low incursion rates. At low incursion rates, the abrasive particles disposed within the ceramic matrix perform as "cutters", machining away the counterpart abradable material. The abrasive particles minimize the interaction between the ceramic matrix and the abrasive material at low incursion rates and thereby minimize the stress introduced into the ceramic matrix. At high incursion rates, the durability of the ceramic matrix enables it to retain the abrasive particles.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
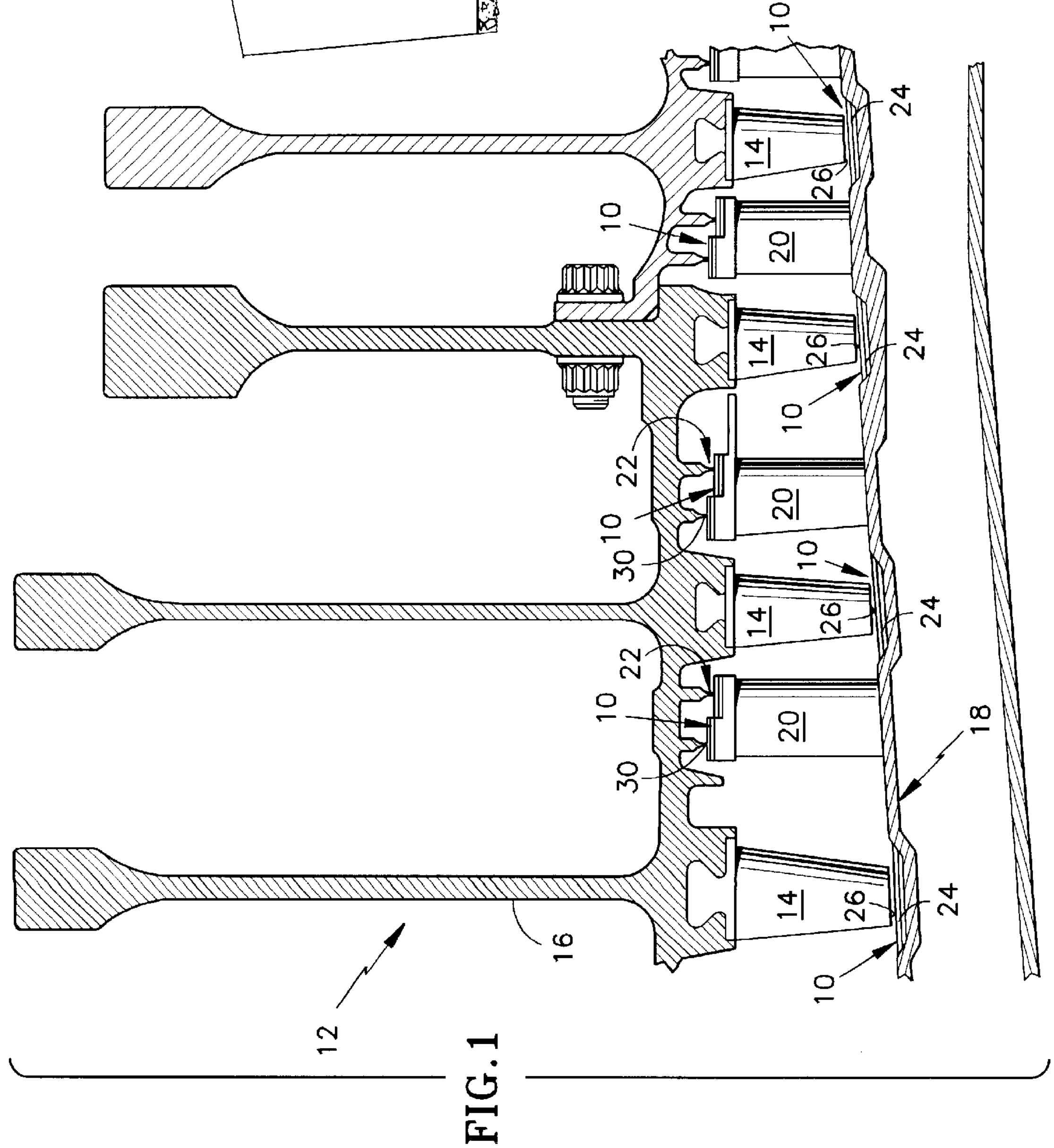
FIG. 1 is a diagrammatic view of a gas turbine rotor assembly having abradable seals.

Referring to FIG. 1, according to the invention an abradable seal 10 is provided that may be used in a rotor assembly 12 of a gas turbine engine (not shown). The rotor assembly 12 includes a plurality of airfoils 14 attached to a hub 16 which together rotate about a center axis. A stationary casing 18 is disposed radially outside of the rotatable airfoils 14. The casing 18 includes a plurality of stator vanes 20 disposed between the rotatable airfoils 14. Knife edge seals 22 attached to the rotating hubs 16 seal between the stator vanes 20 and the hubs 16.

The abradable seal includes an abradable component 24 and an abrasive component 26. The abradable component 24 may be one of a variety of abradables known in the art such as a plasma sprayed coating having a high degree of porosity. Porosity may be obtained by a variety of techniques including, but not limited to, varying the plasma spray parameters, using relatively large particles, or co-spraying a material such as polyester or salt which may be subsequently purged.

Figure 2:
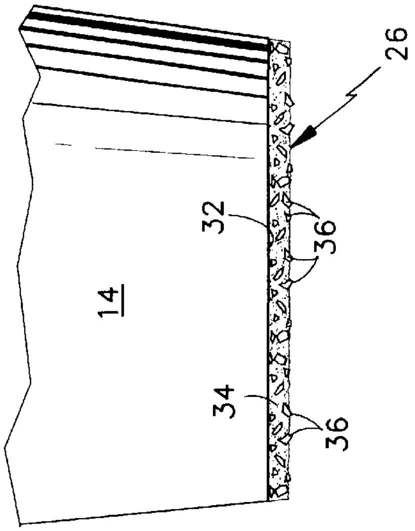
FIG. 2 is a diagrammatic view of the present invention abrasive coating applied to a substrate.

Referring to FIGS. 1 and 2, the abrasive component 26 consists of a composite coating for application to a metallic substrate. The metallic substrate, which in the above examples are the knife edge 30 of the knife edge seal 22 and the tip 32 (FIG. 2) of the airfoil 14, generally consists of nickel or cobalt base super alloy which is cast and machined to a particular geometry. Other metallic substrate materials may be used alternatively. The abrasive coating 26 includes a ceramic matrix 34 and a plurality of ceramic abrasive particles 36. The ceramic matrix 34 is formed from a refractory oxide including, but not limited to, aluminum oxide, titanium oxide, or zirconium oxide, including zirconia stabilized with $Y_2O_3$, CrO, MgO, and the like, or some combination thereof. The particle size of the matrix material is preferably between 3 and 150 microns. In the preferred embodiment, the ceramic abrasive particles 36 are formed from carbides such as, but not limited to, titanium carbide, boron carbide, or silicon carbide, or some combination thereof. In the next preferred embodiment, the ceramic abrasive particles 36 may be formed from nitrides such as, but not limited to, boron nitride, titanium nitride, or silicon nitride, or some combination thereof. The size of the abrasive particles 36 is preferably the same as that of the matrix material 34, between 3 and 150 microns. In all embodiments, the abrasive particles 36 possess an angular geometry, which may be defined as a geometry having sharp edges, and multiple surfaces.

In the coating process, the metallic substrate to be coated is first cleaned to remove any oxidation and contamination that may be present. Grit blasting is the preferred method for cleaning because it also roughs the finish of the surface for better coating adhesion. Other surface cleaning methods, such as acid etching, may be used alternatively, however. In the best mode, the abrasive coating 26 is applied by atmospheric plasma spraying. Other coating methods, such as vacuum plasma spraying or high velocity oxyfuel (HVOF), may be used alternatively. For sake of complete enablement, two specific examples of coating application are given hereinafter. These are examples and as such do not represent all the configurations possible using the present invention.

EXAMPLE I

In this example, the coating 26 is applied to a nickel base super alloy which is cast, machined to a particular geometry, and cleaned as described heretofore. Aluminum oxide powder, particle size preferably between 3 and 150 microns, is used as a constituent for the ceramic matrix. The aluminum oxide may include trace amounts of silicon dioxide, iron oxide and titanium oxide. The abrasive particles are provided as titanium carbide powder having a particle size preferably between 3 and 150 microns. A dual powder port plasma spray torch, for example a "Metco 7M" model gun marketed by the Sulzer Metco Corporation, is used to plasma spray the coating under atmospheric conditions. The powders are fed from canisters using nitrogen ($N_2$) as a carrier gas. Both powders are fed to the gun at a feed rate of approximately ten (10) grams per minute, with the carrier gas set at a rate between two and one half (2.5) and three and one half (3.5) standard liters per minute (SLPM). The primary gas for the plasma spraying process, nitrogen ($N_2$), is adjusted to pass through the gun at approximately fifteen (15.0) SLPM and the secondary gas, hydrogen ($H_2$), is set at approximately seven (7.0) SLPM. The voltage setting of the gun is set between sixty-five (65) and eighty-five (85) volts and the current setting is set between five hundred (500) and six hundred and fifty (650) amps. The gun nozzle is positioned two to two and one half inches (2–2.5") from the substrate. The gun is adjusted to a speed of approximately twelve (12) inches per minute. The above stated conditions and settings yield an abrasive coating having a profile of approximately 60% aluminum oxide matrix and 40% titanium carbide abrasive particles.

EXAMPLE II

In this example, the coating 26 is applied to a nickel base super alloy which is cast, machined to a particular geometry, and cleaned as described heretofore. Aluminum oxide powder, particle size preferably between 3 and 150 microns, is used as a constituent for the ceramic matrix. The aluminum oxide may include trace amounts of silicon dioxide, iron oxide and titanium oxide. The abrasive particles are provided as silicon carbide powder having a particle size preferably between 3 and 150 microns. The aforementioned dual powder port plasma spray torch is used to plasma spray the coating under atmospheric conditions. The powders are feed from canisters using nitrogen ($N_2$) as a carrier gas. Both powders are fed to the gun at a feed rate between half (0.5) and one and a half (1.5) grams per minute, with the carrier gas ($N_2$) set at a rate between one and a half (1.5) and three (3) SLPM. The primary gas ($N_2$) is adjusted to pass through the gun at approximately fifteen (15.0) SLPM and the secondary gas ($H_2$) is set at approximately seven (7) SLPM. The voltage setting of the gun is set between sixty-five (65) and eighty-five (85) volts and the current setting is set between three hundred and fifty (350) and four hundred and fifty (450) amps. The gun nozzle is positioned approximately four (4) inches from the substrate. The gun is adjusted to a speed of approximately twelve (12) inches per minute. The above stated conditions and settings yield an abrasive coating having a profile of approximately 60% aluminum oxide matrix and 40% silicon carbide abrasive particles.

In all examples, the coating 26 contains a roughly symmetrical distribution of abrasive particles dispersed throughout the ceramic matrix. The abrasive particles maintain substantially the same angular geometry they possessed in the powder form, and some of those angular geometries extend out of the ceramic matrix.

Although this invention has been shown and described with respect to the detailed embodiments thereof, it will be understood by those skilled in the art that various changes in form and detail thereof may be made without departing from the spirit and the scope of the invention. For instance, both examples utilize carbide-type abrasive particles 36 and aluminum oxide matrices 34. It is noted infra that other abrasive particles (e.g. nitrides) and refractory oxides (e.g. titanium oxide, zirconium oxide, etc.) may be used alternatively. In addition, specific quantities are given in the two examples for spray variables. The magnitude of these quantities may not encompass of the possible settings for these variables, and therefore should not be construed as limitations. Rather, they are given only to specify the best mode known by the inventors in two specific examples.

We claim:

1. A composite coating having abrasive properties for application to a metallic substrate, comprising:

a ceramic matrix, for bonding to the metallic substrate; and a plurality of ceramic abrasive particles, disposed within said ceramic matrix, said abrasive particles having a shear strength substantially greater than that of said ceramic matrix, and an angular geometry.

2. A composite coating having abrasive properties according to claim 1, wherein said ceramic abrasive particles are selected from the group consisting of carbides and nitrides.

3. A composite coating according to claim 2, wherein said ceramic matrix is a refractory oxide.

4. A composite coating according to claim 3, wherein said ceramic matrix comprises greater than 50% of said composite coating.

5. A composite coating according to claim 3, wherein said ceramic matrix comprises 60% of said composite coating.

6. A composite coating according to claim 4, wherein said coating is applied to said substrate by plasma spraying.

7. An article for use in a gas turbine engine rotor assembly, comprising:

a body, consisting of a metallic material; and a composite coating, bonded to a surface of said body, said coating including a ceramic matrix and a plurality of ceramic abrasive particles, disposed within said ceramic matrix, said abrasive particles having a shear strength substantially greater than that of said ceramic matrix, and an angular geometry.

8. An article according to claim 7, wherein said ceramic abrasive particles are selected from the group consisting of carbides and nitrides.

9. An article according to claim 8, wherein said ceramic matrix is a refractory oxide.

10. An article according to claim 9, wherein said ceramic matrix comprises greater than 50% of said composite coating.

11. A composite coating according to claim 10, wherein said coating is applied to said substrate by plasma spraying.

12. A powder blend for plasma spraying an abrasive coating, comprising:

a refractory oxide ceramic powder; and a plurality of abrasive particles, said abrasive particles having a shear strength substantially greater than said ceramic powder, and an angular geometry;

wherein said powder blend consists of approximately equal volumetric amounts of said ceramic powder and said abrasive particles; and wherein said mesh size of said ceramic powder and said abrasive particles are approximately equal.

13. A powder blend according to claim 12, wherein said ceramic abrasive particles are selected from the group consisting of carbides and nitrides.

* * * * *